United States Patent
Combs et al.

(10) Patent No.: US 9,346,692 B2
(45) Date of Patent: May 24, 2016

(54) REDUCTION OF ORGANIC PHOSPHORUS ACIDS

(75) Inventors: Michael Combs, Shady Spring, WV (US); Denis Fallon, Blacksburg, VA (US)

(73) Assignee: CELANESE INTERNATIONAL CORPORATION, Irving, TX (US)

( * ) Notice: Subject to any disclaimer, the term of this patent is extended or adjusted under 35 U.S.C. 154(b) by 374 days.

(21) Appl. No.: 13/223,736

(22) Filed: Sep. 1, 2011

(65) Prior Publication Data

US 2013/0056422 A1   Mar. 7, 2013

(51) Int. Cl.
| | |
|---|---|
| B01D 21/01 | (2006.01) |
| B03D 3/00 | (2006.01) |
| C02F 1/52 | (2006.01) |
| C02F 1/68 | (2006.01) |
| B01D 37/00 | (2006.01) |
| C02F 1/00 | (2006.01) |
| C02F 1/66 | (2006.01) |
| C02F 101/10 | (2006.01) |
| C02F 101/30 | (2006.01) |
| C02F 103/36 | (2006.01) |

(52) U.S. Cl.
CPC .......... *C02F 1/5245* (2013.01); *C02F 1/66* (2013.01); *C02F 2101/105* (2013.01); *C02F 2101/30* (2013.01); *C02F 2103/36* (2013.01); *C02F 2209/02* (2013.01); *C02F 2209/06* (2013.01)

(58) Field of Classification Search
None
See application file for complete search history.

(56) References Cited

U.S. PATENT DOCUMENTS

| | | | |
|---|---|---|---|
| 4,035,293 A * | 7/1977 | Benoit et al. | 210/710 |
| 4,183,808 A | 1/1980 | Drnevich | |
| 5,622,697 A * | 4/1997 | Moore, Jr. | 424/76.6 |
| 6,110,385 A | 8/2000 | Copa et al. | |
| 7,070,747 B2 * | 7/2006 | Yasunaga et al. | 423/299 |
| 7,713,423 B2 | 5/2010 | Moller et al. | |
| 2005/0000908 A1* | 1/2005 | Karlsson et al. | 210/722 |
| 2007/0151932 A1* | 7/2007 | Bolduc | 210/724 |
| 2007/0187329 A1 | 8/2007 | Moller et al. | |
| 2008/0242913 A1 | 10/2008 | Staton et al. | |
| 2008/0314830 A1 | 12/2008 | Banerjee et al. | |
| 2010/0051526 A1 | 3/2010 | Lawrence et al. | |

FOREIGN PATENT DOCUMENTS

| | | |
|---|---|---|
| CN | 101565177 A | 10/2009 |
| CN | 101704606 A | 5/2010 |
| CN | 101786747 A | 7/2010 |
| CN | 101941770 A | 1/2011 |
| JP | 2002-159977 A | 6/2002 |

(Continued)

OTHER PUBLICATIONS

Machine translation of Hasegawa, et al. JP 2009255078A, pp. 1-31.*

(Continued)

*Primary Examiner* — Nam Nguyen
*Assistant Examiner* — Clare Perrin
(74) *Attorney, Agent, or Firm* — Kilpatrick Townsend & Stockton LLP

(57) ABSTRACT

The present invention is to a process for reducing and removing organic phosphorus acid from waste stream. The process involves adding a multivalent metal salt to the waste stream and adjusting the pH level of the waste stream to an optimum level to maximize the removal of organic phosphorus acid.

16 Claims, 3 Drawing Sheets

(56) References Cited

FOREIGN PATENT DOCUMENTS

| JP | 2006-122794 A | | 5/2006 | |
|---|---|---|---|---|
| JP | 2007-260556 A | | 10/2007 | |
| JP | 2009-255078 A | | 11/2009 | |
| JP | 2009255078 A | * | 11/2009 | ............... C02F 1/72 |

OTHER PUBLICATIONS

Bialkowski, et al. "Triprotic Acid Titration with Strong Base", 2004, website: http://ion.chem.usu.edu/~sbialkow/Classes/3600/Overheads/H3A/H3A.html, accessed Mar. 30, 2015, pp. 1-6.*
Iron(III) Chloride Hexahydrate MSDS, Fisher Scientific, 2001, pp. 1-5.*
Iron(III) Nitrate Nonahydrate MSDS, Sigma-Aldrich, 2015, pp. 1-8.*
Ferric Sulfate Monohydrate MSDS, Fisher Scientific, 2005, pp. 1-4.*
International Search Report and Written Opinion mailed Jan. 15, 2013 in corresponding International Application No. PCT/US2012/053381.
"Phosphoric Acids and phosphates," Wikipedia, Jun. 27, 2011, pp. 1-7.
International Preliminary Report on Patentability for PCT/US2012/053381 mailed Mar. 13, 2014.
Chinese Office Action mailed on Jul. 16, 2015 for CN Patent Application No. 201280042697.8, with English translation, 18 pages.
Chinese Office Action mailed on Dec. 2, 2014 for CN Patent Application No. 201280042697.8, with English translation, 19 pages.
Chinese Office Action mailed on Dec. 15, 2015 for CN Patent Application No. 201280042697.8, with English translation, 14 pages.

* cited by examiner

REDUCTION OF ORGANIC PHOSPHORUS ACIDS

FIELD OF THE INVENTION

The present invention relates generally to the removal of organic phosphorus acids from water streams, more particularly to remove organic phosphorus acids by using metal salts and adjusting the pH level of the water streams.

BACKGROUND OF THE INVENTION

Phosphorus is a nutrient vital to human, animal, and plant life. It is one of the most common substances in our environment, naturally occurring in our food, water, and bodies, as well as, in human and animal waste. However, excess phosphorus in freshwater systems can lead to undesirable consequences. For example, an excess amount of phosphorus in bodies of water can lead to accelerated plant growth, algae blooms, low dissolved oxygen, and death of certain fish, invertebrates and other aquatic animals.

Inorganic phosphate and organic phosphorus acids can often be found in byproducts from manufacturing plants, animal production facilities, detergents, wastewater, and storm water. Effluent streams from such plants commonly contain inorganic phosphate and organic phosphorus acids, which may be discharged into rivers and lakes. Municipal wastewater may contain from 5 to 20 mg/l of total phosphorus, of which 1-5 mg/l is organic and the remaining in inorganic form. Realizing the undesirable effects of excess phosphorus in water, countries and municipalities have imposed limits on the amount of phosphorus that may be permitted in effluent streams.

Phosphorus may be removed from streams using filtration for particulate phosphorus, membrane technologies, precipitation, assimilation, or enhanced biological phosphorus removal methods. For precipitation, inorganic phosphates may be removed by adding a coagulant and mixing the wastewater and coagulant mixture through the use of multivalent metal ions, such as calcium, aluminum and iron. Organic phosphorus typically is removed by converting to inorganic phosphates and precipitating using conventional methods. Nonetheless, most phosphorus removal treatments mainly target the removal of inorganic phosphates, but do not target or optimize the removal of organophosphorus acids in the water stream. These water streams with organic phosphorus acids are released into rivers and lakes. Hence, potentially causing harm to the environment.

The need therefore exists for methods for reducing the amount of organic phosphorus acids that is contained in effluent streams without converting it to inorganic phosphorus species.

SUMMARY OF THE INVENTION

In a first embodiment, the present invention is directed to a process for reducing or removing organic phosphorus acids from a water stream. The process comprises the steps of: providing a water stream comprising water and one or more organic phosphorus acids; and adding a metal salt to the water stream under conditions effective to form a precipitant and thereby reducing the amount of the organic phosphorus acids contained in the water stream.

In a second embodiment, the present invention is directed to a process comprising the steps of: providing a water stream comprising water and at least one organic phosphorus acid; introducing an iron salt into the water stream to form an iron phosphorus precipitant with the organic phosphorus acid; adjusting the pH of the water stream to an optimal level; and removing the iron phosphorus precipitant from the water stream.

BRIEF DESCRIPTION OF DRAWINGS

The invention is described in detail below with reference to the appended drawings, wherein like numerals designate similar parts.

DETAILED DESCRIPTION OF THE INVENTION

Figure 1:
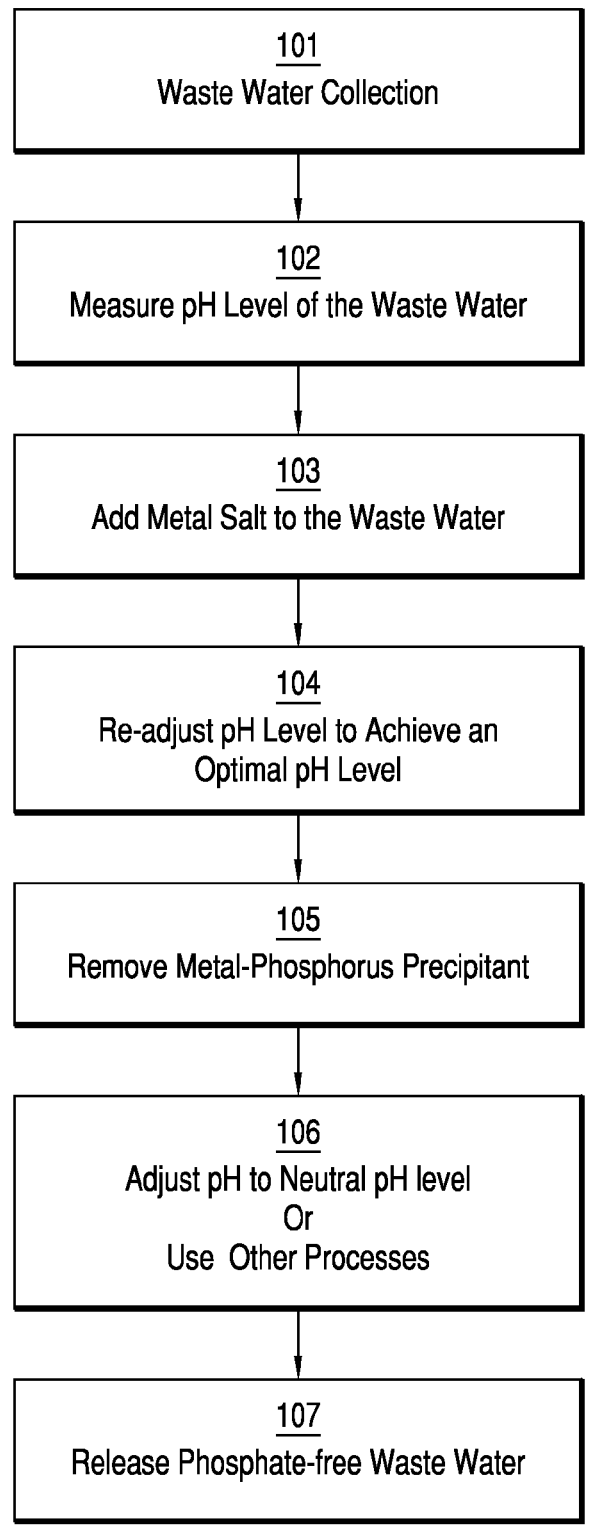
FIG. 1 illustrates a flow diagram for the reduction of organic phosphorus acids in accordance with an embodiment of the present invention.

The present invention is directed to a process for reducing the level of organic phosphorus acids contained in a water stream, e.g., a waste water stream, in an economical manner. The water stream may be derived from a manufacturing plant, residential waste, storm drainage, or elsewhere. The term "effluent stream" or "effluent" refer to any water post treatment.

As used herein, the term "phosphorus acids" refers to oxoacids of phosphorus. A large number of phosphorus acids exist and a large number of these cannot be isolated and are only known through their salts. Several non-limiting examples are provided in Table 1. In another embodiment, the phosphorus acid may be alkylated. For example, in some embodiments, the phosphorus acid is selected from the group consisting of phosphonic acid, hypophosphorous acid, methyl phosphonic acid, methyl ester phosphonic acid, dimethyl phosphinic acid, phosphonic acid precursors, hypophosphorous acid precursors, or their derivatives thereof.

TABLE 1

EXEMPLARY PHOSPHORUS ACIDS

| Compound | Name | P Oxidation State |
|---|---|---|
| $H_3PO_2$ or $H_2PO(OH)$, | Hypophosphorous acid or Phosphinic acid | +1 |
| $H_3PO_3$ or $HPO(OH)_2$ | Phosphorous acid or Phosphonic acid | +3 |
| $H_3PO_4$ or $PO(OH)_3$ | Phosphoric acid | +5 |
| $H_3PO_5$ or $OP(OH)_2OOH$ | Peroxomonophosphoric acid | +5 |
| $H_4P_2O_6$ or $(OH)_2P(O)-P(O)(OH)_2$ | Hypophosphoric acid | +4 |
| $H_4P_2O_7$ or $(OH)_2(O)P-O-P(O)(OH)_2$ | Pyrophosphoric acid | +5 |

The process of the present invention comprises adjusting the pH level of the water stream comprising one or more organic phosphorus acids to reach an optimal pH level, preferably a pH less than 7, e.g., from about 3 to about 8, and adding a metal salt to the water stream. The metal salts reacts with the organic phosphorus acid to form a precipitant, which may be subsequently separated from the water stream via filtration, decanting, or other means to yield a final water stream containing less organic phosphorus acids than the initial water stream.

Multivalent metal salts, such as ferric chloride, are typically used to remove inorganic phosphate from waste water. It has now been surprisingly and unexpectedly discovered that at an optimal pH level, e.g., less than 7.0, multivalent metal salts, such as ferric chloride, and in particular the cationic species thereof, effectively reacts with the organic phosphorus species to form a precipitant and thereby reducing the amount of organic phosphorus acids contained in the waste water the removal efficiency of which is impacted by the pH while inorganic phosphate is not impacted. In one embodiment, the present invention is to a process of reducing organic phosphorus acids, such as phosphonic acid, hypophosphorus acid, methyl phosphonic acid, methyl ester phosphonic acid, dimethyl phosphinic acid, phosphonic acid precursors or derivatives, and hypophosphorous acid precursors or derivatives, using multivalent metal salts and by adjusting the pH of the waste water to an optimal level.

In some embodiments, the optimal pH level of the waste water may be adjusted by using the multivalent metal salt, a basic aqueous solution or an acidic aqueous solution. Suitable metals for use in the multivalent metal salt include those selected from the group consisting of iron, nickel, calcium, magnesium, aluminum, titanium, manganese, lead, copper, magnesium, potassium, sodium tin, zinc, and cobalt. Suitable multivalent metal salts may be selected from the group consisting of ferric chloride, ferrous chloride, ferric sulfate, ferrous sulfate, calcium hydroxide, lime, calcium oxide, alum, aluminum hydroxides, magnesium acetate, magnesium oxide.

In some embodiments, suitable basic aqueous solution may be solutions of sodium hydroxide, potassium hydroxide, or other alkali metal solutions that have a pH greater than 7, e.g., greater than 8, greater than 9, or greater than 10.

In some embodiments, suitable acidic aqueous solution include, for example, sulfuric acid, nitric acid, hydrochloric acid, sulfuric acid, or other strong acidic acid solutions having a pH of less than 6, e.g., less than 5, less than 4, or less than 3. Preferably, the acidic aqueous solution has a pH of from 1 to 6, e.g., from 1 to 5, from 1 to 4 or from 2 to 4.

Depending on the source of the water stream, e.g., waste water stream, the pH level of the water stream may initially range from between pH 5 to 8. In order to achieve an optimal pH level in the waste water to remove organic phosphorus acids, an acidic or a basic aqueous solution may be added to the waste water. In some embodiments, the optimal pH level is between pH 3 and pH 7, e.g., between pH 3.5 and pH 6.5, or between pH 4 and pH 6. It has been discovered that at the optimal pH level, multivalent metal salt binds to organic phosphorus acids to form a metal phosphorus complex, which advantageously precipitates from the water stream, where removal efficiency decreases outside these optimal ranges. The precipitants may be filtered or decanted using conventional solid particle separation techniques.

In some embodiments, an excess amount of metal salt may be used to precipitate the organic phosphorus acids. For example, the molar ratio of metal salt to organic phosphorus acid may be greater than 1:1, e.g., greater than 2:1, greater than 3:1, greater than 4:1, or greater than 5:1. It has been found that in accordance with the present invention, the majority of the organic phosphorus acid in the water stream preferentially binds to the metal salt and may be subsequently removed from the water stream. In some embodiments, for example, at least 50% of the organic phosphorus acid may be removed, at least 65% may be removed, at least 80% may be removed, or at least 85% may be removed, or at least 90% may be removed from the water stream.

In another embodiment of the invention, the effluent stream is substantially free of phosphours acids, e.g., the effluent stream comprises less than 5 mg/l phosphours acids, less than 4 mg/l phosphours acids, or less than 3.2 mg/l phosphours acids. Thus, the process according to the present invention efficiently and economically removes phosphorus from waste water.

One application that is especially well-suited for the inventive processes of the present invention is in the reduction and removal of organic phosphorus acids in the waste water of an acetic anhydride manufacturing process. Acetic anhydride is made by reacting acetic acid in the presence of a phosphate catalyst under high temperature to form a ketene intermediate. The ketene intermediate then reacts with acetic acid to form acetic anhydride. As a result, organic phosphorus acid compounds, such as methyl phosphonic acid and dimethyl phosphinic acid, are formed as byproducts, which may find their way into the waste water of the acetic anhydride production plant. The inventive process may be used to facilitate removal of these compounds from the waste water stream.

Exemplary Method

FIG. 1 illustrates an exemplary process or method 100 for removing organic phosphorus acids from waste water in an acetic anhydride manufacturing process, or other process or waste stream, in accordance with one embodiment of the present invention.

At step 101, waste water from the acetic anhydride process is collected in an influent tank, which contains organic phosphorus byproduct. The amount of organic phosphorus byproduct may be anticipated based on the acetic anhydride manufacturing process.

Depending on the source of the waste water from the acetic anhydride process, the pH may vary. At step 102, the pH level in the waste water may be measure. Optionally, the pH level in the waste water may be adjusted using acidic aqueous solution, such as sulfuric acid, or basic aqueous solution, such as sodium hydroxide or potassium hydroxide. The amount of acidic aqueous solution or basic aqueous solution that is added to the waste water is based on the measured pH.

At step 103, ferric chloride is added to the waste water to react with the phosphorus acid and form a precipitant, which precipitates from the water stream. Surprisingly and unexpectedly, it has now been discovered that organic phosphorus removal efficiency depend on the pH of the waste water while inorganic phosphorus is only slightly impacted or not impacted at all. The inventors discover that at an optimal pH level, for example, pH less than 7.0, and in particular between pH 4.0 and pH 6.0, the majority of the organic phosphorus acids reacts with the cation, e.g., iron, of the metal salt, e.g., ferric chloride, and precipitates out of the waste water and may be effectively removed. The inventors also discover that at high or low pH, inorganic phosphorus is effectively removed from the waste water stream. Thus, by adjusting the pH of the water stream, organic phosphorus acid may be selectively and effectively removed at pH between 4.0 and 6.0 and inorganic phosphorus may be removed at pH outside of that range.

In preferred embodiments, at least 30%, at least 50%, at least 75%, at least 85% or at least 90% of the phosphorus acid components precipitate from the water stream and are effectively separated therefrom. The amount of ferric chloride added may be determined by the anticipated amount of organic phosphorus contained in the water stream. An excess amount of metal salt, e.g., ferric chloride, may be added to the waste water as indicated above. For example, the molar ratio of metal salt, e.g., ferric chloride, to organic phosphorus may be at least 1:1, at least 2:1, at least 3:1, at least 4:1, or at least 5:1. In an embodiment, at least 20%, at least 50%, at least 80%, or at least 90% of iron phosphorus precipitates at between pH 4.0 to pH 6.0.

At optional step 104, due to the acidic nature of ferric chloride, the addition of ferric chloride to the waste water may shift the pH of the waste water outside of the optimal pH level, i.e., the waste water has a pH lower than pH 4.0, or pH 3.5, or pH 3.0. In some embodiments, basic solutions, such as sodium hydroxide or potassium hydroxide, may be added to readjust the pH to the optimal level.

At step 105, the iron phosphorus precipitant may be removed using various methods known in the art, including ultra filtration membrane, sand filter, decanting, or slow settling filter, and may be disposed.

At step 106, a suitable amount of aqueous basic solution or acidic solution may be added to the residual liquid to achieve a neutral pH if the residual liquid is to be disposed of. In the case where the residual liquid may be used for additional processes rather than disposed of, it may not be necessary to adjust the pH of the residual liquid.

At step 107, the waste water with neutral pH and reduced phosphorus content may be released to river or other water source or sent to waste water treatment.

Experiments and Results

Figure 2:
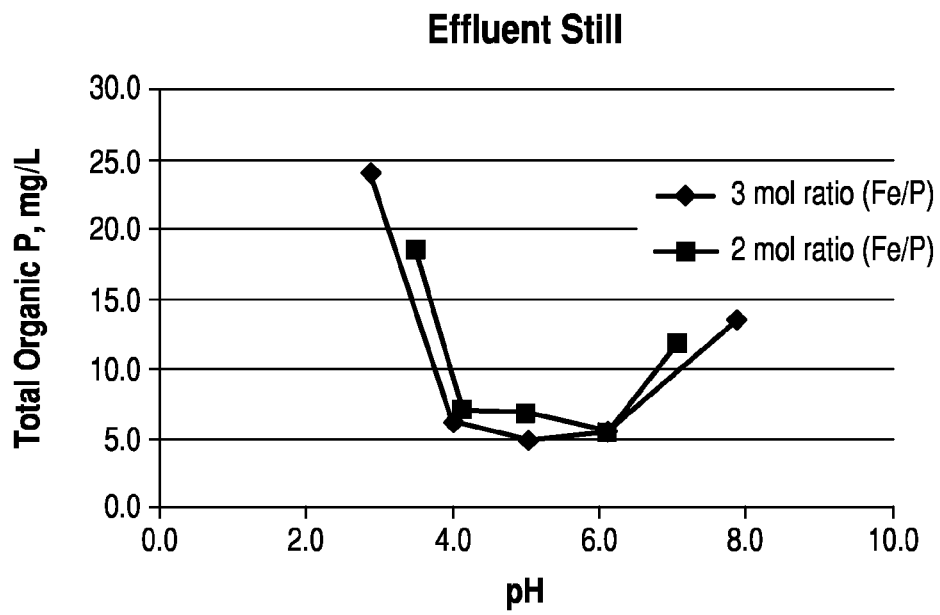
FIG. 2 is a graph showing the level of total organic phosphorus versus pH level in the water stream during phosphorus removal treatment.

FIG. 2 shows a graph of total organic phosphorus concentration versus pH level of a water stream, e.g., waste water stream. As illustrated in the graph, the total organic phosphorus level is high when the waste water has a pH 3 to pH 3.5. The organic phosphorus level is significantly lower when the pH of the waste water is between about pH 4 and about pH 6. However, the total organic phosphorus level in the waste water is also high when the pH for waste water is greater than about 6 or greater than about 7.

FIG. 2 also compares the use of 2 and 3 moles of iron for each 1 mole of phosphorus. As shown in the graph, the amount of organic phosphorus removed for 2:1 mol ratio for Fe:P is similar to the amount of organic phosphorus removed for 3:1 mol ratio of Fe:P. On the surface, the use of 3:1 mol ratio of Fe:P did not appear to provide an advantage over 2:1 mol ratio of Fe:P. Nonetheless, the difference between 2:1 mol ratio and 3:1 mol ratio is significant because by using 3:1 mol ratio of Fe:P the total organic phosphorus acid in the water stream is reduced from 6.8 mg/L to 4.9 mg/L. This 28% increase in total organic phosphorus acid removal brings the total organic phosphorus acid amount to below 5/0 mg/L. The amount of organic phosphorus acid at different pH levels and the effect of Fe:P molar ratio are shown in Table 1.

TABLE 1

Iron:Phosphorus Ratio and pH Effect on
Total Organic Phosphorus Acid Removal

| Fe:P ratio | pH | Total Organic Phosphorus acid (mg/L) | % Total Organic Phosphorus Acid Removal |
|---|---|---|---|
| 0 | — | 36.9 | — |
| 2 | 3.5 | 18.5 | 49.8 |
| 2 | 4.1 | 7.0 | 81.0 |
| 2 | 5.0 | 6.8 | 81.6 |
| 2 | 6.1 | 5.4 | 85.3 |
| 2 | 7.1 | 11.9 | 67.7 |
| 3 | 2.9 | 24.0 | 35.0 |
| 3 | 4.0 | 6.1 | 83.5 |

TABLE 1-continued

Iron:Phosphorus Ratio and pH Effect on
Total Organic Phosphorus Acid Removal

| Fe:P ratio | pH | Total Organic Phosphorus acid (mg/L) | % Total Organic Phosphorus Acid Removal |
|---|---|---|---|
| 3 | 5.0 | 4.9 | 86.7 |
| 3 | 6.1 | 5.5 | 85.1 |
| 3 | 7.9 | 13.5 | 63.5 |

Figure 3:
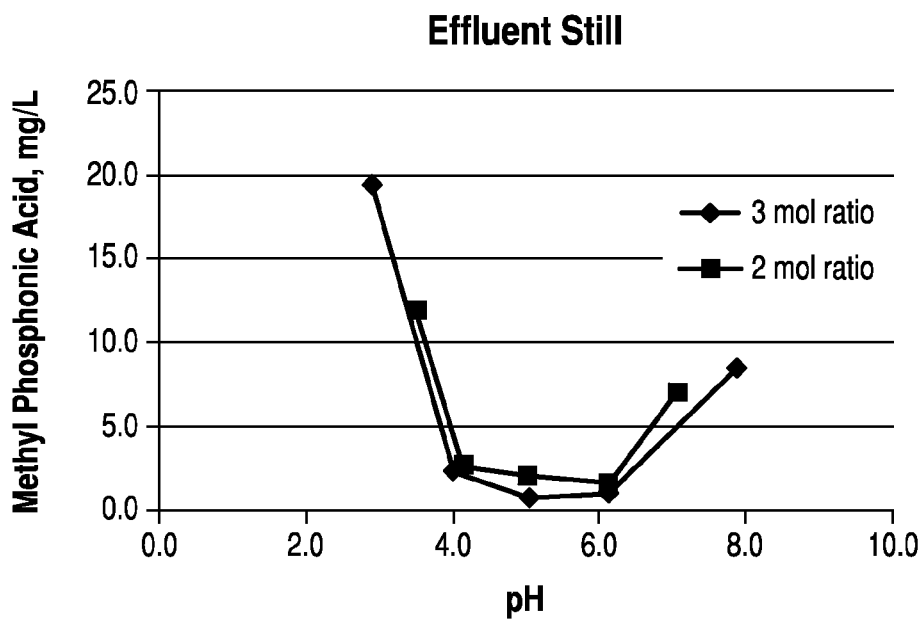
FIG. 3 is a graph showing the level of methyl phosphonic acid versus pH level in the water stream during phosphorus removal treatment.

FIG. 3 shows a graph of methyl phosphonic acid concentration versus pH level of the water stream. Similar to FIG. 2, when the pH level of the waste water is outside of the optimal range of about pH 4 and pH 6, a high level of methyl phosphonic acid was detected in the waste water. Surprisingly and unexpectedly, between pH 4 and pH 6, a very low level of methyl phosphonic acid was detected, less than 2.7 mg/l. Significantly, at pH 5.0 using 3:1 mole ratio of Fe:P, the amount of methyl phosphonic acid is reduced to 0.8 mg/L.

FIG. 3 also shows that the use of 3:1 mol ratio of Fe:P provides a significant advantage over 2:1 mol ratio of Fe:P. For example, at pH 5.0, the amount methyl phosphonic acid in the water stream was reduced from 2.1 mg/L to 0.8 m/L, which is a 62% increase in methyl phosphonic acid removal. The amount of methyl phosphonic acid at different pH levels and the effect of Fe:P molar ratio are shown in Table 2.

TABLE 2

Iron:Phosphorus Ratio and pH Effect
on Methyl Phosphonic Acid Removal

| Fe:P ratio | pH | Methyl Phosphonic acid (mg/L) | % Total Methyl Phosphonic Acid Removal |
|---|---|---|---|
| 0 | — | 29.7 | — |
| 2 | 3.5 | 11.9 | 59.9 |
| 2 | 4.1 | 2.7 | 91.1 |
| 2 | 5.0 | 2.1 | 92.8 |
| 2 | 6.1 | 1.6 | 94.6 |
| 2 | 7.1 | 7.1 | 76.1 |
| 3 | 2.9 | 19.4 | 34.9 |
| 3 | 4.0 | 2.4 | 92.0 |
| 3 | 5.0 | 0.8 | 97.3 |
| 3 | 6.1 | 1.0 | 96.5 |
| 3 | 7.9 | 8.5 | 71.4 |

Figure 4:
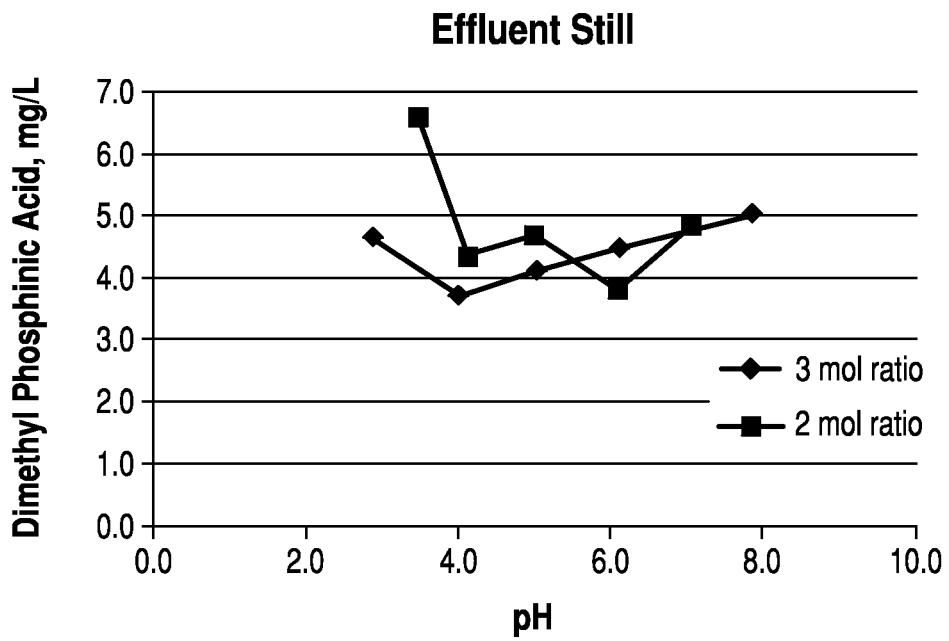
FIG. 4 is a graph showing the level of dimethyl phosphinic acid versus pH level in the water stream during phosphorus removal treatment.

FIG. 4 is yet another example of the effect of pH level on phosphorus acid. FIG. 4 shows a graph of dimethyl phosphinic acid concentration versus pH level of the water stream. As shown, by using 2:1 mol ratio of Fe:P and at pH 3.5, the amount of dimethyl phosphinic acid in the water stream is about 6.6 mg/L. As the pH of the water increases, the amount of dimethyl phosphinic acid decreases. Surprisingly and unexpectedly, the amount of dimethyl phosphinic acid is lowest for 2:1 mole ratio of Fe:P at pH 6.1 and for 3:1 mole ratio of Fe:P at pH 4.0. This demonstrates that both pH and mole ratio of Fe:P effects the amount of dimethyl phosphinic acid removal.

In addition, for 3:1 mole ratio of Fe:P, the level of dimethyl phosphinic acid is lowest at about pH 4.0. Surprisingly and unexpectedly, the concentration of dimethyl phosphinic acid again shows a minimum at pH between 4 and 6. The amount of dimethyl phosphinic acid at different pH levels and the effect of Fe:P molar ratio are shown in Table 3.

TABLE 3

Iron:Phosphorus Ratio and pH Effect
on Dimethyl Phosphinic Acid Removal

| Fe:P ratio | pH | Dimethyl Phosphinic acid (mg/L) | % Dimethyl Phosphinic Acid Removal |
|---|---|---|---|
| 0 | — | 7.2 | — |
| 2 | 3.5 | 6.6 | 8.1 |
| 2 | 4.1 | 4.3 | 39.2 |
| 2 | 5.0 | 4.7 | 34.7 |
| 2 | 6.1 | 3.8 | 46.9 |
| 2 | 7.1 | 4.8 | 32.8 |
| 3 | 2.9 | 4.6 | 35.2 |
| 3 | 4.0 | 3.7 | 47.9 |
| 3 | 5.0 | 4.1 | 42.6 |
| 3 | 6.1 | 4.5 | 37.8 |
| 3 | 7.9 | 5.0 | 30.3 |

The graphs shown in FIGS. 2 to 4 indicate that adjusting the pH level of water stream to an optimal level, e.g., less than 7.0, preferably between about pH 4.0 to about pH 6.0, beneficially increases the removal of organic phosphorus acid. Therefore, a pattern can be established that a maximum amount of organic phosphorus acid may be removed at between about pH 4.0 to pH 6.0. The data also indicates that the use of 3:1 mol ratio of Fe:P beneficially removes more organic phosphorus acid over 2:1 mol ratio of Fe:P.

Figure 5:
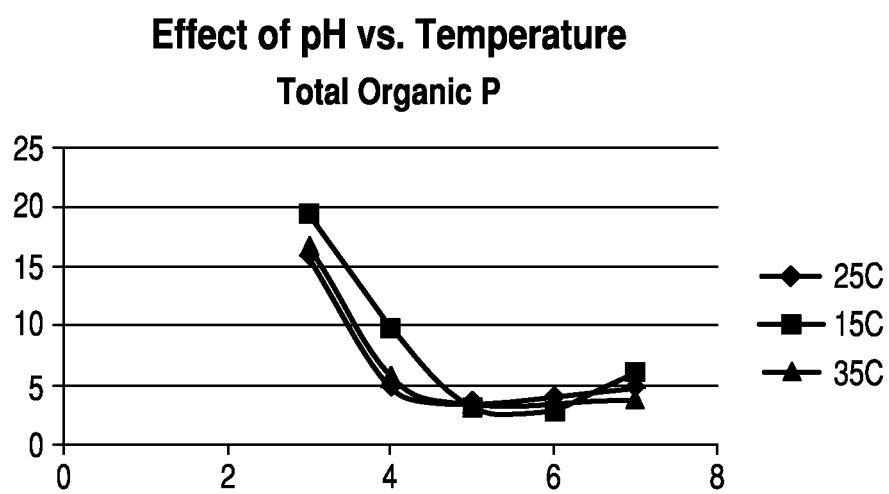
FIG. 5 is a graph showing the effect of temperature and pH level on total organic phosphorus in the water stream during phosphorus removal treatment.

FIG. 5 shows a graph of the effect of temperature and pH level on the concentration of total organic phosphorus acid in the water stream using 3:1 mole ratio of Fe:P. As shown, at about pH 3, the level of total organic phosphorus acid is the highest in the water stream for all three temperatures. For all three temperatures, as the pH of the water stream increases, the level of total organic phosphorus acid in the water stream decreases.

Furthermore, the amount of total organic phosphorus acid reaches their respective lowest level at about pH 5 at 25° C. and 35° C. and at about pH 6 for 15° C. Surprisingly and unexpectedly, temperature appears to have an effect with the removal of total organic phosphorus acid. For example, at 15° C. and pH 3.99, the amount of total organic phosphorus acid in the water stream is 12.9 mg/L. In comparison, at 25° C. and pH 4.00 and 35° C. and pH 3.99, the amount of total organic phosphorus acid in the water stream decreases to 6.2 and 6.9, respectively.

Surprisingly and unexpectedly, the temperature effect does not appear to influence the amount of organic phosphorus acid in the water stream at pH greater than 4.0. As shown in the graph, at pH less than about 5, the amount of organic phosphorus acid in the water stream is higher at 15° C. than at ambient temperature or at elevated temperature (35° C.). Surprisingly and unexpectedly, the amount of organic phosphorus acid in water for all three temperatures at pH 5 only differs by 0.3 mg/L. The amount of total organic phosphorus acid at different temperature is shown in Table 4.

TABLE 4

Temperature Effect on Total Organic Phosphorus Acid Removal

| Temperature | pH | Total Organic Phosphorus acid (mg/L) | % Total Organic Phosphorus Acid Removal |
|---|---|---|---|
| 0 | — | 36.9 | — |
| 15 | 3.11 | 27.6 | 31.4 |
| 15 | 3.99 | 12.9 | 65.1 |
| 15 | 5.02 | 3.4 | 88.7 |
| 15 | 6.01 | 3.1 | 89.7 |
| 15 | 7.55 | 6.1 | 79.1 |
| 25 | 3.08 | 22.2 | 44.0 |
| 25 | 4.00 | 6.2 | 82.8 |
| 25 | 4.94 | 3.7 | 87.5 |
| 25 | 6.07 | 4.1 | 86.1 |
| 25 | 7.09 | 4.8 | 83.6 |
| 35 | 3.06 | 21.1 | 40.5 |
| 35 | 3.99 | 6.9 | 79.8 |
| 35 | 5.01 | 3.5 | 88.3 |
| 35 | 6.03 | 3.6 | 87.9 |
| 35 | 7.08 | 3.9 | 86.8 |

Table 5 is a comparison of the effect of pH on the total organic phosphorus acid versus inorganic phosphorus removal. As shown, the initial inorganic phosphorus in the water stream is 69.7 mg/L. Regardless of the molar ratio of Fe:P or the pH of the water stream, over 99.6% of the inorganic phosphorus is removed from the water stream. In comparison, as discovered by the inventors, the amount of total organic phosphorus acid removed is pH dependent. At a pH between 4.0 and 6.0, over 80% of organic phosphorus acid is removed. However, at pH levels outside of this range, no greater than 68% of the organic phosphorus acid is removed from the water stream. Therefore, in order to remove the maximum amount of organic phosphorus acid from the water stream, the pH of the water stream is adjusted to an optimum level of between pH 4.0 to 6.0.

TABLE 5

Effect of pH on Total Organic Phosphorus
Acid vs. Inorganic Phosphorus Removal

| Fe:P ratio | pH | Total Organic Phosphorus acid (mg/L) | % Total Organic Phosphorus Acid Removed | Inorganic Phosphorus (mg/L) | % Inorganic Phosphorus Removed |
|---|---|---|---|---|---|
| 0 | — | 36.9 | — | 69.7 | — |
| 2 | 3.5 | 18.5 | 50% | N/A | N/A |
| 2 | 4.1 | 7.0 | 81% | 0.135 | 99.81% |
| 2 | 5.0 | 6.8 | 82% | 0.025 | 99.96% |
| 2 | 6.1 | 5.4 | 85% | 0.022 | 99.97% |
| 2 | 7.1 | 11.9 | 68% | 0.025 | 99.96% |
| 3 | 2.9 | 24.0 | 35% | N/A | N/A |
| 3 | 4.0 | 6.1 | 83% | 0.244 | 99.65% |
| 3 | 5.0 | 4.9 | 87% | 0.021 | 99.97% |
| 3 | 6.1 | 5.5 | 85% | 0.028 | 99.96% |
| 3 | 7.9 | 13.5 | 63% | 0.019 | 99.97% |

EXAMPLE

A 10 g sample containing 17 mg/L methyl phosphonic acid was obtained. The pH of the sample is measured at pH 7.0. A 0.02 g of 37% ferric chloride solution was added to the methyl phosphonic acid solution. The pH of the mixture was measured to be approximately 3.0. 0.1M NaOH is added to raise the pH of the solution to 4.0. The solution was agitated for less than 60 seconds. The temperature was maintained at room temperature (approximately 25° C. The precipitate was filtered using a 0.45 μm PTFE filter.

The experiment was repeated at different pH, temperature, and Fe:P molar ratio. The total amount of phosphorus was measured using an inductively coupled plasma before the experiment. The amount of inorganic phosphorus was measured using a spectrometric wet chemical test. The amount of organic phosphorus acid was calculated by subtracting the amount of inorganic phosphorus from the total amount of phosphorus measured and reported in the above tables. The amount of methylphosphonic acid and dimethyl phosphinic acid were measured using ion chromatography with suppressed conductivity method.

It is noted that this procedure may be applied to an industrial scale process.

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference. In addition, it should be understood that aspects of the invention and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit the invention.

We claim:

1. A method for reducing organic phosphorus acid content in an effluent water stream, comprising:
   providing the effluent water stream comprising one or more organic phosphorus acids;
   adjusting the effluent water stream to reach an optimal pH level from 4 to 6 to form an adjusted water stream; and
   adding a metal salt to the adjusted water stream to form a precipitant with the one or more organic phosphorus acids and thereby reducing the amount of organic phosphorus acids contained therein; wherein at least 80% of organic phosphorus acid is removed from the effluent water stream.

2. The method of claim 1, wherein the effluent water stream further comprises one or more inorganic phosphates.

3. The method of claim 1, wherein the adjusting step comprises adding a basic aqueous solution to the effluent water stream to reach the optimal pH level.

4. The method of claim 1, wherein the adjusting step comprises adding an acidic aqueous solution to the adjusted water stream after the addition of metal salt.

5. The method of claim 1, wherein metal salt is selected from the group consisting of salts of iron, nickel, calcium, magnesium, aluminum, titanium, manganese, lead, copper, magnesium, potassium, sodium, tin, zinc, and cobalt.

6. The method of claim 1, wherein the metal salt is selected from the group consisting of ferrous chloride, ferric sulfate, and ferrous sulfate.

7. The method of claim 1, wherein the molar ratio of the metal salt to the organic phosphorus acid is from 1:1 to 5:1.

8. The method of claim 1, wherein the metal salt is ferric chloride.

9. The method of claim 8, wherein the molar ratio of iron to phosphorus is from 2:1 to 3:1.

10. The method of claim 1, wherein the organic phosphorus acid is selected from the group consisting of phosphonic acid, hydrophosphorous acid, methyl phosphonic acid, methyl ester phosphonic acid, and dimethyl ether phosphonic acid.

11. A method for reducing organic phosphorus acid content in an effluent water stream, comprising:
    providing the effluent water stream comprising an organic phosphorus acid;
    adjusting the effluent water stream to reach an optimal pH level from 4 to 6 to form an adjusted water stream;
    introducing an iron salt into the adjusted water stream to form an iron phosphorus precipitant with the organic phosphorus acid; and
    removing the iron phosphorus precipitant from the adjusted water stream; wherein at least 80% of the organic phosphorus acid is removed from the effluent water stream.

12. The method of claim 11, wherein the iron salt comprises iron (III) chloride.

13. The method of claim 11, wherein the molar ratio of iron to phosphorus is from 1:1 to 5:1.

14. The method of claim 11, wherein the molar ratio of iron to phosphorus is from 2:1 to 3:1.

15. The method of claim 11, further comprising:
    determining the pH level of the adjusted water stream;
    neutralizing the adjusted water stream; and
    discarding the adjusted water stream.

16. The method of claim 11, wherein the organic phosphorus acid is selected from the group consisting of phosphonic acid, hydrophosphorous acid, methyl phosphonic acid, methyl ester phosphonic acid, and dimethyl ether phosphonic acid.

* * * * *